April 9, 1968  R. SCHARDT  3,376,764
PNEUMATIC POSITIONING TABLE
Filed Aug. 19, 1965  3 Sheets-Sheet 1
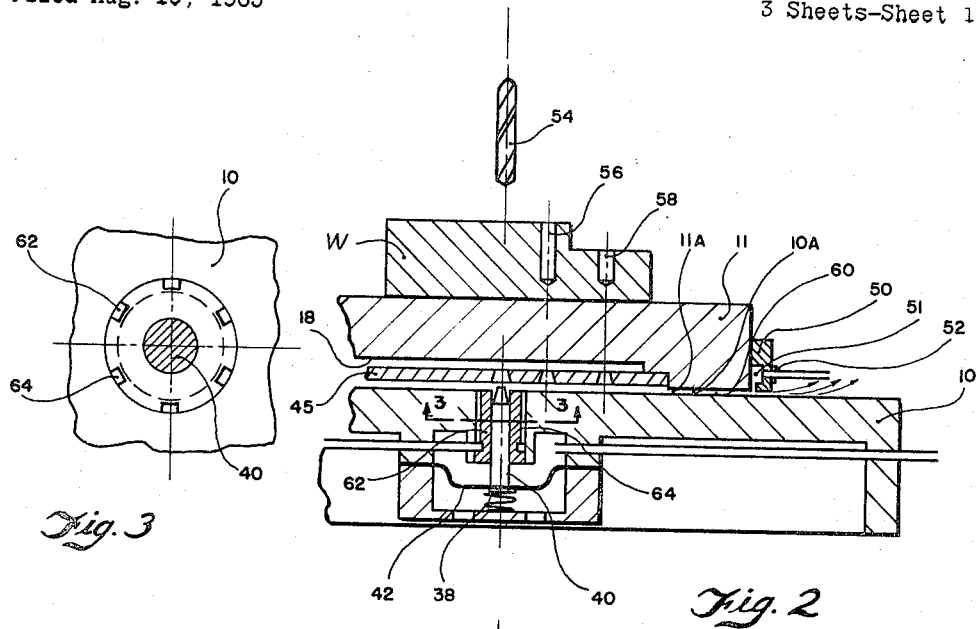
Fig. 3
Fig. 2
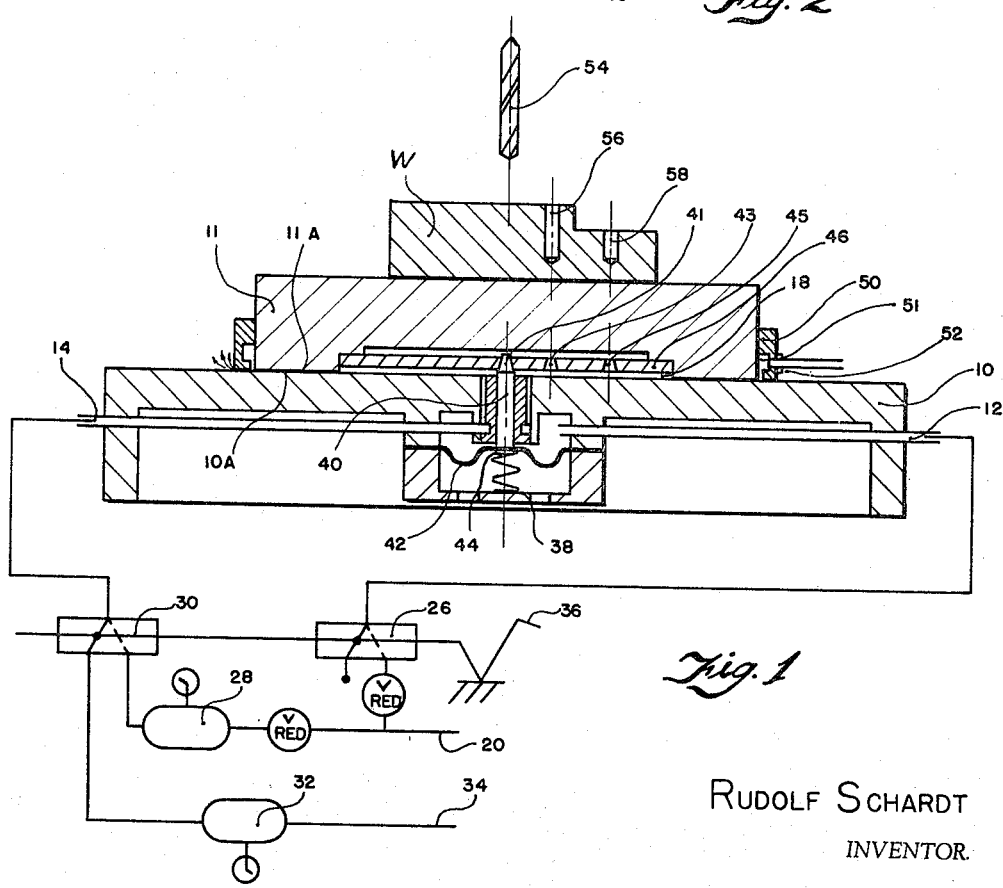
Fig. 1
RUDOLF SCHARDT
INVENTOR.
BY

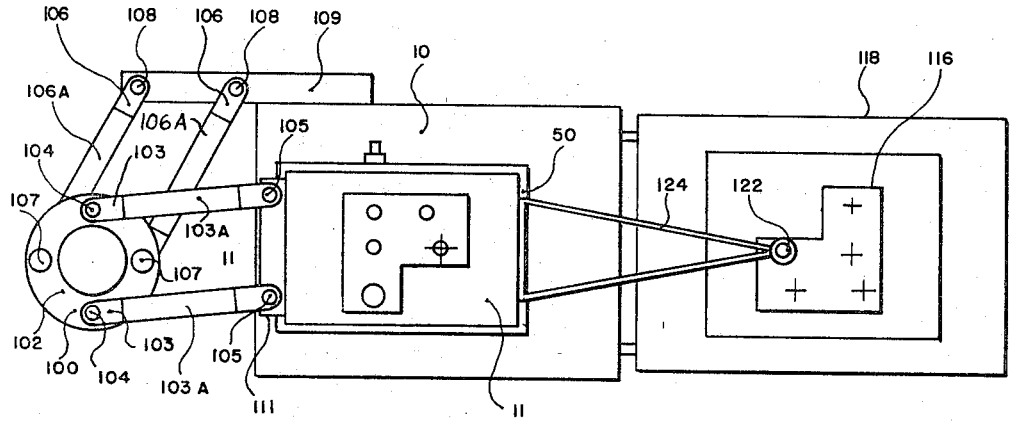
Fig. 4
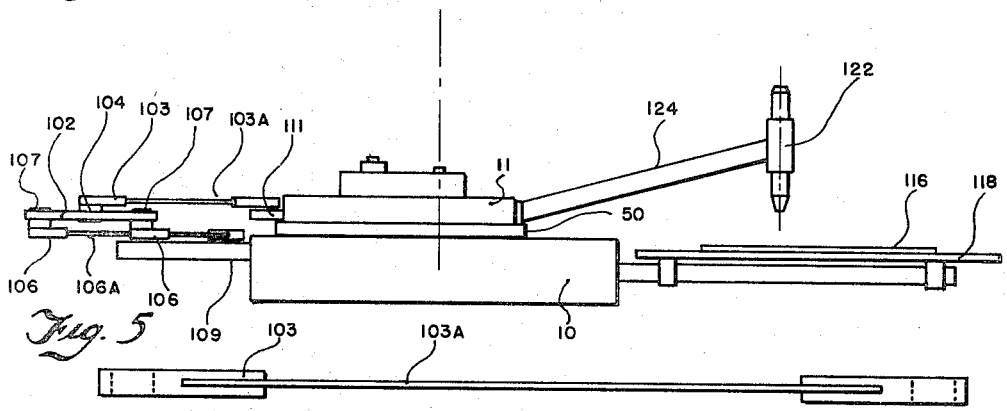
Fig. 5
Fig. 6
RUDOLF SCHARDT
INVENTOR.

April 9, 1968  R. SCHARDT  3,376,764
PNEUMATIC POSITIONING TABLE
Filed Aug. 19, 1965  3 Sheets-Sheet 3

RUDOLF SCHARDT
*INVENTOR.*

BY

United States Patent Office 3,376,764
Patented Apr. 9, 1968

3,376,764
PNEUMATIC POSITIONING TABLE
Rudolf Schardt, 3510 Laverne Drive,
Houston, Tex. 77024
Continuation-in-part of application Ser. No. 230,353,
Oct. 15, 1962. This application Aug. 19, 1965, Ser.
No. 480,965
The portion of the term of the patent subsequent to
Oct. 5, 1982, has been disclaimed and dedicated
to the Public
5 Claims. (Cl. 77—64)

This application is a continuation-in-part of my copending application Ser. No. 230,353, filed Oct. 15, 1962, and now Patent No. 3,209,263.

This invention pertains generally to machine tools, and particularly to positioning devices which may be used as components of machine tools.

In the machine tool art, particularly in machine shops, drill jigs which are used to accurately locate and guide a drill or similar cutting tool on a work piece for the purpose of material removal present a costly and time-consuming problem. Such jigs require precision in the construction of component parts, and, therefore, highly skilled personnel are required for constructing and maintaining the jigs in operable condition. For many years improved methods and means for rapidly and inexpensively indexing or positioning work pieces with relation to the cutting tool have been elusive problems.

Also in known positioning devices time-consuming effort has been required for locking the jigs to properly position the work piece relative to the cutting tool. Conventional positioning devices commonly require guideways, such as V's or dovetails of various shapes to form abutments against which the positioning device or jig is secured to properly position the work piece. Such abutment means, however, necessarily limit the freedom of movement of the positioning relative to the cutting tool, generally to two directions and thus greatly reduce the efficiency of the machining operations. Furthermore, known locking apparatus has left much to be desired in the way of simplicity, low cost, reliability, and lack of distortion due to locking forces.

In the aforesaid copending application, I have disclosed a novel form of positioning device for positioning a work piece by the employment of a positioning table which is frictionlessly supportable on an air film or so-called "air bearing" for free movement relative to an indexing template and which employs vacuum means for locking the positioning device in place when the work piece has been appropriately positioned.

One of the features of my invention is the ability to move a positioning table with complete freedom as to direction so that it is possible to accurately position a work piece without the use of the conventional guide ribs or flanges which, as noted, necessarily limit the direction of movement of the work-supporting table with respect to the base.

My aforesaid copending application also disclosed the use of a pantograph arrangement for coupling the movable work table to a base so as to keep the X-Y axes of the work table with respect to the base true at all times so that irrespective of the direction of movement of the work-supporting table relative to the base these axes will be kept true and thereby assure absolutely accurate indexing of the work with respect to the cutting tool. By combining the pantograph element with the air bearing and vacuum lock arrangement, the operator has complete freedom in the direction of movement of the work-supporting table relative to the indexing elements. It should be understood that the employment of the pantograph means in this connection is altogether different than the common application of a pantograph, which is ordinarily used to change the scale of a drawing or a device which is being traced.

In operating an air-vacuum controlled positioning device of the character described in my copending application, I find that where cutting oil or other cooling fluids are employed the application of vacuum in locking the positioning device to the base may tend to suck some of the liquid between the bearing surfaces of the positioning table and base and thence into the vacuum pump and create difficulty in operation. The present invention has for one of its objects the provision of an improved positioning table employing means which will be effective to prevent such liquids from being drawn into the vacuum pump and will, therefore, overcome the difficulty noted.

Accordingly, it is a principal object of the present invention to provide the improved work-positioning apparatus.

An important object is the provision of a work-positioning apparatus employing an air-bearing for floating the positioning table to permit movement thereof relative to a base of like support, and vacuum means for locking the positioning device to the base.

A further object is the provision of a positioning device employing vacuum locking means and which includes air-operated shield means for preventing entrance of cooling fluid into the vacuum-applying means.

Still another object of the present invention is to provide a positioning apparatus in which a movable positioning table is coupled to a supporting base by a pantograph device which accurately and continuously maintains the X-Y axes of the positioning device to the supporting base completely true throughout all movements of the positioning device.

Other and more specific objects and advantages of this invention will become more readily apparent from the following detailed description when read in conjunction with the accompanying drawings which illustrate several useful embodiments in accordance with this invention.

In the drawings:

FIG. 1 is a cross-sectional, elevational view partly schematic, of the invention showing the positioning table in locked condition;

FIG. 2 is a cross-sectional, elevational view of a portion of the positioning table shown in FIG. 1 when the locking means is in unlocked condition;

FIG. 3 is a plan view taken along line 3—3 of FIG. 2;

FIG. 4 is a plan view showing a pantograph and a microscope attachment incorporated in the present invention;

FIG. 5 is an elevational view of the pantograph and microscope attachment shown in FIG. 4;

FIG. 6 is a side elevational view of one of the pantograph arms; and

Figures 7, 8:
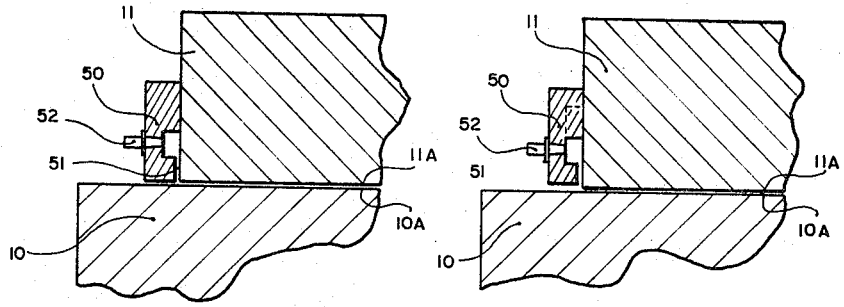

FIGS. 7 to 11, inclusive, are fragmentary, sectional views showing several different modifications of shield means by which cutting fluids or the like may be excluded from entrance between the positioning table and its supporting base.

In practicing the invention, one embodiment of suitable positioning apparatus is provided for positioning a work piece in relation to a tool and then locking the work piece after the selected positioning has occurred. The positioning and locking means of the present invention may include a base, a work table, an indexing plunger, a template, a source of compressed air and controls therefor, and a controlled vacum. The base provides a flat top surface and an indexing plunger assembly may be suitably located in the base. The indexing plunger may be spring-loaded so that it projects above the base surface and is connected to a diaphragm assembly inside the base. The projecting portion of the plunger may be tapered or of other suitable shape for ease in registering with the holes in the template. An air inlet in the diaphragm chamber enables air pressure to retract the plunger below the base surface to free the table for movement to another point relative to the template. When the air pressure is removed from the diaphragm chamber, the spring will return the plunger against the template surface. The work table then is moved until the plunger projects into another hole in the template. A plurality of air holes are located around the plunger and it is through these holes that low air pressure is supplied below the work table for the purpose of floating the work table on a film of air. The air pressure may be adjustable, since the required pressure depends on the work piece weight and area of the work table. The template may be carried in a recess under the work table and the hole pattern required on the work piece will be laid out on the template. Holes of proper size are provided in the template so that the spring-loaded plunger may register without any play, thereby locating the work table with the work piece accurately for each operation. Once the work table is located, a vacuum may be drawn under the work table to secure the table against any shifting during the working operation. In certain instances vacuum may not be necessary when the torque created by the working tool on the work piece is relatively small.

An alternate arrangement of the present invention utilizes a pantograph and microscope attachment whereby the template may be eliminated by working off of an accurate drawing. When the pantograph and microscope attachment is used, a drawing table is fastened to the base.

A pantograph connects the work table to the base. A support on the work table receives a microscope of the desired power with a crosshair reticle. The hole centers on the drawing are sighted through the microscope and the work table is properly positioned and vacuum locked prior to the operation on the work piece.

It is important to understand, however, that the pantograph coupling the movable work table to the base may be employed without a guiding device, such as the microscope, but may also be employed with indexing plungers as herein described, or any other indexing arrangement, it being particularly important in an apparatus of the type herein described, wherein a working-supporting table is to be moved on an air film relative to a cutting tool and an indexing arrangement, to employ the pantograph coupling, herein disclosed, between the work table and the base to effect absolutely accurate positioning of the work table without limiting the freedom in direction of movement in positioning the work.

Referring now to the drawing in detail, FIG. 1 is a combined schematic and cross-sectional, elevational view of one embodiment of the present invention. A base member, designated generally by the numeral 10, has a flat planar upper surface 10a. A work-supporting table 11 is disposed for movement over surface 10a and is formed with a lower face 11a which is also of generally flat planar form adapted to seat snugly on surface 10a when the table is in locked position, as will be described subsequently. Base member 10 has two openings 12 and 14. Through opening 12 gas pressure provides control of the indexing plunger through a diaphragm 42. Opening 14 offers access to the chamber provided by a cavity 18 in lower table face 11a when table 11 rests on surface 10a. A gas pressure source 20 connects to a multi-port plunger control valve 26 and a lower pressure air tank 28, respectively. The gas pressure source may be a pneumatic source, such as the shop air supply found in most machine shops.

The low pressure air tank 28 is coupled to a multi-port valve 30 which controls the floating and locking of the work table. Also coupled to valve 30 is a vacuum tank 32 which is coupled to a vacuum pump (not shown) through a vacuum inlet 34. An actuator 36 is coupled to control valve 26 and to the table float and lock valve 30. The actuator may be a foot pedal or other suitable apparatus which is convenient for the particular operation being performed.

The central portion of base 10 includes indexing plunger means. The latter includes resilient means 38, plunger 40, and diaphragm 42. Resilient means 38 may be a spring suitably coupled to a portion of the base and to one end 44 of plunger 40. Diaphragm 42 is disposed intermediate the resilient means 38 and is also coupled to end 44 of plunger 40. The opposite end 41 of plunger 40 is tapered to fit into a plurality of locating holes, such as holes 43 and 45, provided in a template 46. Template 46 is positioned in recess 18 of work table 11. The latter has a work piece W positioned thereon for machining by a suitable tool, such as a drill 54, to provide holes, such as holes 56 and 58, in the work piece.

FIG. 1 shows the work piece W in position for tool 54 to penetrate the work piece which has been aligned by the plunger 40 through engagement in the appropriate hole in template 46. FIG. 1 shows the work table in a locked position which has been created by the application of a vacuum between face 11a of work table 11 and surface 10a of base 10.

FIG. 2 shows a portion of the base and table assembly of FIG. 1 with the work table 11 in a floating position. To attain this floating position, gas pressure will have been applied through inlet 12 above diaphragm 42 to cause the latter to move downwardly and overcome the force of resilient means 38. The downward movement of diaphragm 42 causes plunger 40 to be retracted so that the tapered end 41 will be withdrawn from engagement with template 46. Simultaneously, low pressure air is caused to enter recess 18 through inlet 14. The air will escape through space 60 between work table face 11a and surface 10a of base 10. Thus, when air pressure is applied to the apparatus of the present invention, a lifting action occurs on the work table which will then float on the film of air interposed between the work table and base, so that the work table is freed to be moved relative to the base in a frictionless manner. The amount of pressure necessary for raising the work table from the base will be dictated, as will be evident, by the weight of the work piece W and the contact area of work table 50.

As best seen in FIG. 3, a plurality of ports, such as ports 62 and 64, allow communication between chamber 18 and the low pressure air source or vacuum source, depending upon the position of valve 30.

Thus, actuator 36, shown in FIG. 1, provides control of the gas pressure applied to diaphragm chamber 16 and to chamber 18 to float the work table 11 relative to base 10. Actuator 36 has three operating positions: At full actuation valves 26 and 30 are operated; valve 26 actuates diaphragm 42, thereby retracting plunger 40; simultaneously, valve 30 supplies chamber 18 with low pressure, lifting work table 11 and permitting it to be slid on an air film over the upper surface 10a of base 10. At intermediate actuation of actuator 36, diaphragm pressure will be exhausted to atmosphere and plunger 40 will project into engagement with the under face of template 46 due to the biasing force exerted by spring 38 and will, upon lateral movement of the work table, project into another locating hole provided in template 46. Due to low friction of the pneumatic bearing provided by escaping air at the under face 11a of work table 11 and the upper surface 10a of base 10, plunger 40 will locate table 11 with ease and great accuracy. After proper location is thus obtained, actuator 36 is returned to a basic position where valve 30 has switched from low pressure gas supply to vacuum supply, the application of the vacuum thus locking the work table firmly to the base.

From the foregoing, it will be noted that with the arrangement described, there are no restrictions upon the free movement of the work table with respect to the base in order to move the template in relation to the indexing plunger for purposes of indexing the work piece to another position with respect to the cutting tool. It will be noted that no conventional guideways, flanges, or buttressing elements of any sort are employed to control or limit the direction of movement of the work table.

In order, however, to assure complete accuracy in aligning the work with the cutting tool, the present invention employs a pantograph arrangement for coupling the work table to the base. Such a pantograph arrangement is illustrated in FIGS. 4 to 6, inclusive. As seen in FIG. 4, the pantograph, designated generally by the numeral 100, comprises a pivot ring 102, a pair of upper spaced-apart parallel arms 102—103, having one end pivotally connected at diametrically spaced points to the upper face of ring 102 by pivot pins 104—104, and having their opposite ends pivotally connected to an extension 111 of table 11 by means of pivot pins 105—105. The second pair of parallel arms 106—106 are similarly pivotally secured at one end at diametrically spaced points to the lower face of ring 102 by means of pivots 107—107 oriented at 90° with respect to pivots 104—104. The opposite ends of parallel arms 106 are pivotally secured by means of pivot pins 108—108 to a bracket arm 109 securely mounted to base 10. As will be evident from the arrangement illustrated in FIG. 4, the coupling provided by the pantograph between work table 11 and base 10 necessarily forces all movements of work table 11 to maintain the X—Y axes of the work table parallel at all times to the X—Y axes of the base. Thus, the work table may be moved in any direction required to register a template hole with the indexing plunger while maintaining complete accuracy in locating the work relative to the cutting tool.

Since the work table must be elevated with respect to the base during movement from place to place on the air bearing, one or both pairs of arms 103 and 106 is constructed of a resilient, metallic material, so that sufficient bending of the arms out of the planes thereof may occur to accommodate the elevation of the work table when it is raised from the base by the air. As illustrated, arms 103 and 106 include intermediate sections 103a and 106a, respectively, constructed of a flexible material suitable to accomplish this desired function. The flexibility of the arms will not interfere with the freedom of movement of the work table, but will, as noted, allow the table to be elevated uniformly and thereby avoid any binding due to creation of the air bearing under the work table.

As illustrated also in FIGS. 4 and 5, guidance of the work table in indexing the work relative to the cutting tool may be effected by means of a microscope 122 shown mounted on an arm 124 secured to a side of the work table opposite the points of connection of the pantograph arms. The microscope will be employed to guide the work table relative to positions marked on a drawing or similar locating device 116 mounted on a table 118 supported from base 10.

However, as noted previously, the microscope is only one means by which the work may be indexed with respect to a cutting tool, the plunger-template arrangement, previously described, providing another means for accomplishing this purpose. In any event, however, the pantograph coupling is of the utmost importance in assuring not only accuracy of location of the work, but also in implementing the ease of movement of the work relative to the cutting tool in the indexing operation.

In locking the work table to the base, the application of vacuum will be employed, as previously described. In many drilling and other machining operations it is frequently the practice to employ a cutting oil as a cooling and lubricating fluid during the machining operations. Such fluid in a device of the general character herein contemplated will ordinarily be allowed to flow over the work table. As a result, application of the vacuum in locking the table to the base may cause the fluid to be sucked between the table and the base, and thence into the vacuum pump. This may create difficulty in operation of the equipment and should be avoided, if possible. To prevent this undesirable result when cooling fluid is used, the present invention contemplates a modification wherein the work table is provided with an arrangement by which a current of air will be caused to blow downwardly around the periphery of the work table and outwardly therefrom so as to blow fluid falling on the surface of the base about the work table away from the space between the work table and the base while the vacuum is being applied to lock the table to the base. Various embodiments of such shield means may be employed.

As seen particularly in FIGS. 1, 2, and 7 to 9, the shield device includes a frame 50, which may be constructed of metal, plastic, or any other suitable strong material, which completely surrounds the periphery of work table 11 and extends downwardly along the sides thereof to a point generally flush with or slightly above the bottom face of work table 11. The inner side of frame 50 is provided with a slot or groove 51 which provides a clearance space between the frame and the side walls of table 11 opening downwardly to the lower face of the table. A supply of air under pressure is introduced into slot 51 from a suitable source through a fitting 52, generally simultaneously with the application of vacuum between the work table and the base. The current of air will be directed with sufficient force and volume to blow strongly between the frame and the work table and against the upper surface of base 10, so as to form a barrier against inward flow of cooling fluid between the work table and the base. In general, the arrows shown in FIGS. 1 and 2, indicate the outward direction of flow of the air which will prevent the entrance of liquid into the space between the work table and the base.

FIG. 8 shows a modification very similar to FIG. 7, differing from the latter in providing a somewhat greater space between the lower end of frame 50 and the upper surface of base 10, to more positively assure outward flow of the air.

Figure 9:
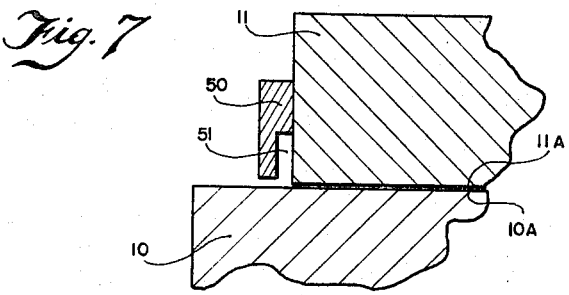

FIG. 9 illustrates still another modification wherein the shape of the slot in the frame is somewhat different from that in the earlier embodiments.

Figures 10, 11:
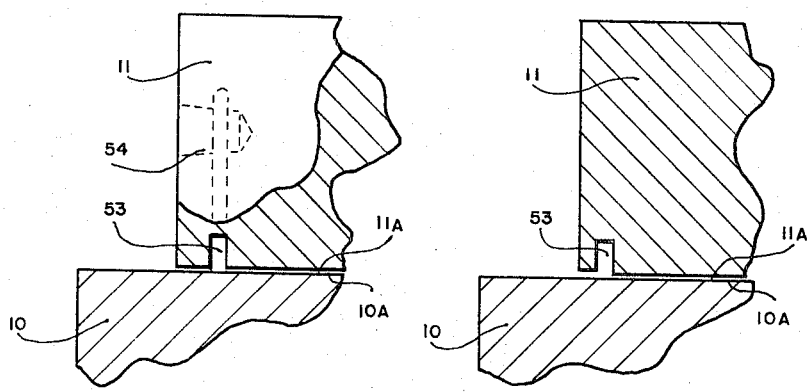

FIGS. 10 and 11 illustrate still other modifications in which a slot 53 is formed in the lower face of work table 11 adjacent the periphery thereof and is supplied with air through passages 54, the air in this arrangement being directed downwardly against the upper face of base 10 and then outwardly between the work table and the base.

FIG. 11 is a slight modification of the slot form shown in FIG. 10, in that the outer side wall of slot 53 is cut away to provide a somewhat greater distance between the lower face of the outer edge of work table 11 and the upper face of base 10 to assure the preferential discharge of air outwardly of the work table.

As seen from the foregoing, the invention provides an improved apparatus for positioning and locking a work piece preparatory to material removal and during such removal from the work piece. The apparatus for achieving the positioning and locking includes a source of gas pressure and a tied-in vacuum source. Although gas, such as air, has proven satisfactory, it is evident that other gaseous fluids may be used in the practice of the invention. The vacuum and the gas pressure are fed between the work table and the base, the gas pressure being used to float the work table for positioning thereof, and the vacuum thereupon being used to lock the work table to the base when located as desired, the vacuum source being used to lock the work table to the base as the floating gas pressure is reduced to zero.

The present invention includes also the important arrangement for accurately guiding the work table in indexing the same relative to the cutting tool, this arrangement being a pantograph-type coupling between the work table and the base. The air barrier or shield for preventing entrance of liquid into the vacuum apparatus when using cooling fluids and the like, constitutes still another highly useful feature of an apparatus in accordance with this invention.

Although preferred embodiments of the invention have been shown and described, it will be understood that numerous modifications and alterations may be made in the details of the illustrative embodiments within the scope of the appended claims but without departing from the spirit of this invention.

What I claim and desire to secure by Letters Patent is:

1. Apparatus for positioning a work piece, comprising
   (a) base means having an upper planar bearing surface,
   (b) a work-supporting table having a lower planar surface disposed for movement over said bearing surface,
   (c) a source of gas pressure coupled to said base means to provide a pneumatic bearing between said surfaces,
   (d) a vacuum source coupled to said base means arranged to substitute a vacuum for said gas pressure whereby to lock the work table to said bearing surface solely by the force of said vacuum,
   (e) indexing means operably disposed between the work table and the base means for indexing the work table on said bearing surface with respect to a cutting tool, and
   (f) pantograph means operably connecting said work table to the base means to continuously maintain a true relation between the X—Y axes of the work table and said bearing surface throughout the indexing movements of the work table.

2. Apparatus for positioning a work piece, comprising,
   (a) base means having an upper planar bearing surface,
   (b) a work-supporting table having a lower planar surface disposed for movement over said bearing surface,
   (c) a source of gas pressure coupled to said base means to provide a pneumatic bearing between said surfaces,
   (d) a vacuum source coupled to said base means arranged to substitute a vacuum for said gas pressure whereby to lock the work table to said bearing surface solely by the force of said vacuum,
   (e) indexing means operably disposed between the work table and the base means for indexing the work table on said bearing surface with respect to a cutting tool, and
   (f) pantograph means operably connecting said work table to the base means to continuously maintain a true relation between the X-Y axes of the work table and said bearing surface throughout the indexing movements of the work table,
   (g) said pantograph means including a pivot ring, upper and lower pairs of parallel arms pivotally connecting said pivot ring respectively to said table and to said base means, at least one of said pairs of arms being of resilient construction to be bendable out of the plane of said surfaces.

3. In apparatus for positioning a work piece including,
   (a) base means having an upper planar bearing surface,
   (b) a work-supporting table having a lower planar surface disposed for movement over said bearing surface,
   (c) a source of gas pressure coupled to said base means to provide a pneumatic bearing between said surfaces, and
   (d) a vacuum source coupled to said base means arranged to substitute a vacuum for said gas pressure whereby to lock said table to said bearing surface solely by the force of said vacuum,
   (e) the improvement for blocking entrance of extraneous fluids between said surfaces when said vacuum is applied, said improvement comprising,
   (f) means carrier by said table aranged to direct a flow of pressurized gas concentrically about the entire periphery of said table downwardly against said bearing surface and outwardly of said periphery.

4. In apparatus for positioning a work piece including,
   (a) base means having an upper planar bearing surface,
   (b) a work-supporting table having a lower planar surface disposed for movement over said bearing surface,
   (c) a source of gas pressure coupled to said base means to provide a pneumatic bearing between said surfaces, and
   (d) a vacuum source coupled to said base means arranged to substitute a vacuum for said gas pressure whereby to lock said table to said bearing surface solely by the force of said vacuum,
   (e) the improvement for blocking entrance of extraneous fluids between said surfaces when said vacuum is applied, said improvement comprising,
   (f) means carried by said table arranged to direct a flow of pressurized gas concentrically about the entire periphery of said table downwardly toward said surface and outwardly of said periphery,
   (g) said last-mentioned means comprising downwardly opening narrow groove means concentric with and closely adjacent the periphery of said table, and
   (h) means for introducing pressurized gas into said groove means.

5. Apparatus for positioning a work piece, comprising,
   (a) base means having an upper planar bearing surface,
   (b) a work-supporting table having a lower planar surface disposed for movement over said bearing surface,
   (c) a source of gas pressure coupled to said base means to provide a pneumatic bearing between said surfaces,
   (d) a vacuum source coupled to said base means arranged to substitute a vacuum for said gas pressure whereby to lock the work table to said bearing surface solely by the force of said vacuum,
   (e) indexing means operably disposed between the work table and the base means for indexing the work table on said bearing surface with respect to a cutting tool,
   (f) pantograph means operably connecting said work table to the base means to continuously maintain a true relation between the X-Y axes of the work table and said bearing surface throughout the indexing movements of the work table, and
   (g) means carried by said table arranged to direct a flow of pressurized gas concentrically about the entire periphery of said table downwardly against said bearing surface and outwardly of said periphery

References Cited

UNITED STATES PATENTS 3,209,623   10/1965   Schardt _____ 77—64

FRANCIS S. HUSAR, *Primary Examiner.*